UNITED STATES PATENT OFFICE.

WILLIAM FORSTER, OF WINONA, MINNESOTA.

CEMENT.

No. 830,986. Specification of Letters Patent. Patented Sept. 11, 1906.

Application filed May 18, 1906. Serial No. 317,441.

*To all whom it may concern:*

Be it known that I, WILLIAM FORSTER, a citizen of the United States of America, residing at Winona, in the county of Winona and State of Minnesota, have invented certain new and useful Improvements in Cement, of which the following is such a full, clear, and exact description as will enable others skilled in the art to which it appertains to make and use the same.

This invention is a composition for closing or packing the joints in the front ends of locomotives; and the object is to produce a cement which may be easily applied, which will not become brittle and crack while in use, which will not melt and run off when the iron is hot, and which may be easily removed when the joint must be reopened.

In carrying out the invention employ pure mineral graphite, Chinese white or zinc, and pulverized fire-clay. These ingredients are mixed together in the following proportions, by weight: graphite, eighty-five parts; Chinese white or zinc, ten parts, and fire-clay, five parts. To this dry mixture I add a liquid mixer consisting of seven pints of boiled linseed-oil and one pint of quick copal rubbing-varnish, stirring in enough of the liquid mixer to bring the composition to the consistency of soft putty. The composition is applied to the joints in any convenient manner and will effectually seal the same.

The composition may be put up in the dry form and the liquid mixer added when the cement is to be used, or it may be completely mixed and supplied in the putty form in cans. It will not turn hard, so as to be unfit for use.

The graphite and fire-clay will withstand the heat, so as to prevent the melting of the cement, while the Chinese white or zinc acts as a binder to prevent it becoming brittle and cracking. The varnish and linseed-oil impart elasticity and hardness to the composition.

Having thus described my invention, what I claim, and desire to secure by Letters Patent, is—

1. A cement consisting of mineral graphite, Chinese white, fire-clay, and a liquid mixer.

2. A cement consisting of pure mineral graphite, Chinese white, fire-clay, linseed-oil, and varnish.

In testimony whereof I have signed this specification in the presence of two subscribing witnesses.

WILLIAM FORSTER.

Witnesses:
JOHN B. MURPHY,
JOSEPH WHITE.